Feb. 3, 1970    R. T. FURNER    3,492,770
EXTRUDED SECTIONS
Filed April 9, 1968

RONALD THOMAS FURNER
INVENTOR

United States Patent Office 3,492,770
Patented Feb. 3, 1970

3,492,770
EXTRUDED SECTIONS
Ronald Thomas Furner, Birrong, New South Wales,
Australia, assignor of one-half to Denis Desmond
Fischer, Vaucluse, New South Wales, Australia
Filed Apr. 9, 1968, Ser. No. 719,934
Int. Cl. E04b 1/62; E04f 15/14; E04c 3/30
U.S. Cl. 52—400                                    7 Claims

ABSTRACT OF THE DISCLOSURE

A frame assembly in which an elongated metallic non-ferrous extruded core member is provided with a plurality of elongated plastics members on its longitudinal surfaces. Each plastics member has a longitudinal portion engaging in at least one of a plurality of longitudinal recesses formed in the core member and a further longitudinal portion engaging with an adjacent one of the elongated plastics members. The frame assembly can be used as a window frame member in which case the window pane is positioned between adjacent plastics members.

---

Figure 1:
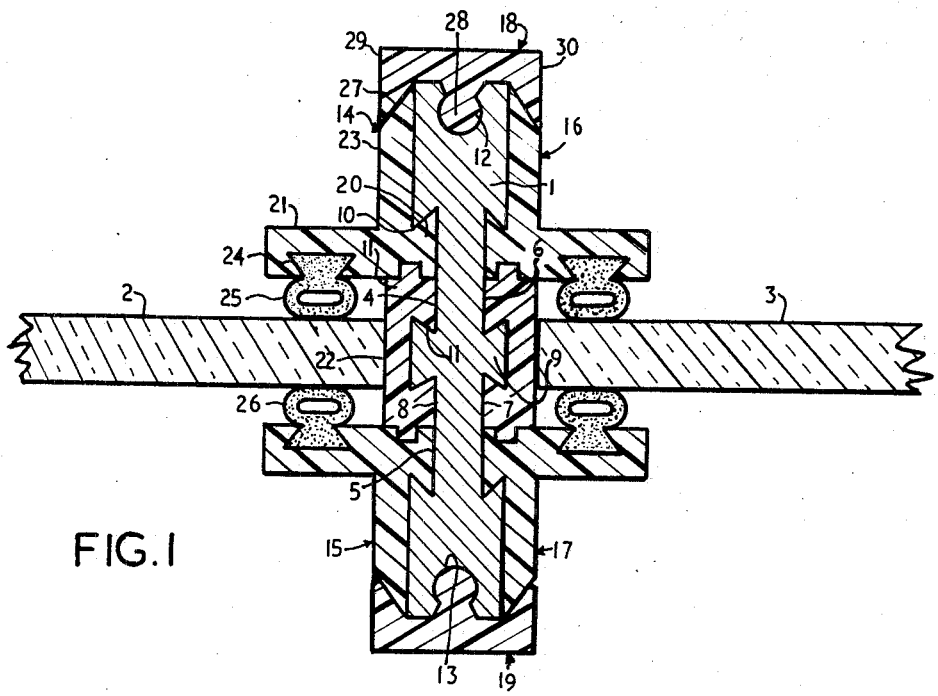

This invention relates to improvements in frame assemblies and in particular to such assemblies having a non-ferrous extruded metallic core and an external plastics sheath which is applied as a plurality of extruded plastics members which interlock with each other and/or with said core to provide a non-corrosive weatherproof cladding completely enclosing substantially all the longitudinal surfaces of said core which would otherwise be exposed.

Although not confined to any particular purpose, such frame assemblies are especially useful as door or window frame members or sashes or in the construction of room dividers or partitions.

It is already known to construct door and window frames and window sashes from aluminium extrusions and whilst these possess many desirable features such as lightness, easy operation and ease in fabrication from the extruded members, they also possess certain inherent limitations. From one aspect, although they are not subject to heavy corrosion due to rusting such as is present in ferrous structures, aluminium extrusions, particularly when exposed to the weather, are subject to surface oxidation which destroys the initial sheen on the extrusions and gives the exposed surfaces a dull, milky and often powdery appearance. From another aspect, the aluminium has normally to be used in its natural colour, as it is difficult to apply a durable colouring material to its surface, even when it is anodised or treated with a base paint such as zinc chromate.

However, it is often desired that such structures as door or window frames or window sashes and other structures which may be fabricated from aluminium extrusions should have a durable surface coating of a colour which will blend with the surroundings or otherwise present an aesthetic appearance and it is accordingly known to cover both ferrous and non-ferrous metal members with a one-piece sheath or cladding of plastics material of the desired colour. Such a one-piece sheath or cladding does not, however, permit the use of more than one colour on any particular member and thus the use of more than one colour on any one member is not practicable.

Furthermore, as many of the extruded members used in present-day structures are of intricate cross-sectional form, the operation of applying a one-piece plastics coating requires the use of complicated and expensive apparatus.

The object of the present invention is to provide an extruded non-ferrous plastics coated frame assembly wherein the above disadvantages are eliminated.

In a general form of the invention there is provided a frame assembly, including an elongated metallic non-ferrous extruded core member having formed longitudinally therein a plurality of recesses, and a plurality of elongated plastics members each having a longitudinal portion engaging in at least one of said recesses and having a further longitudinal portion engaging with an adjacent one of said elongated plastics members.

But a better understanding of the invention may be obtained from the following description of exemplary forms thereof, it being appreciated, however, that this description is exemplary, only, and that the invention per se is not intended to be limited by any specific terms necessarily used for the purpose of this description but only by the limitations imposed by the foregoing definition thereof.

Particularly is it to be appreciated that the invention is not to be regarded as being limited to the precise cross-sectional shapes of the metallic and plastics members about to be described, as these relate only to the frame members of a glazed window. It will, however, be obvious that other cross-sectional shapes will be readily adapted, by those skilled in the art, to the particular purpose for which they are to be used without departing from the basic concept of the invention.

The mullion or mullions of a window divide the window sash or frame either horizontally or vertically into two or more sections into which a glass pane is fitted. The glass panes lie in the same plane as the major plane of the window or its frame and for stiffening purposes the mullions each has a portion projecting normal to that plane, to the inside and the outside of the window or frame.

Figure 2:
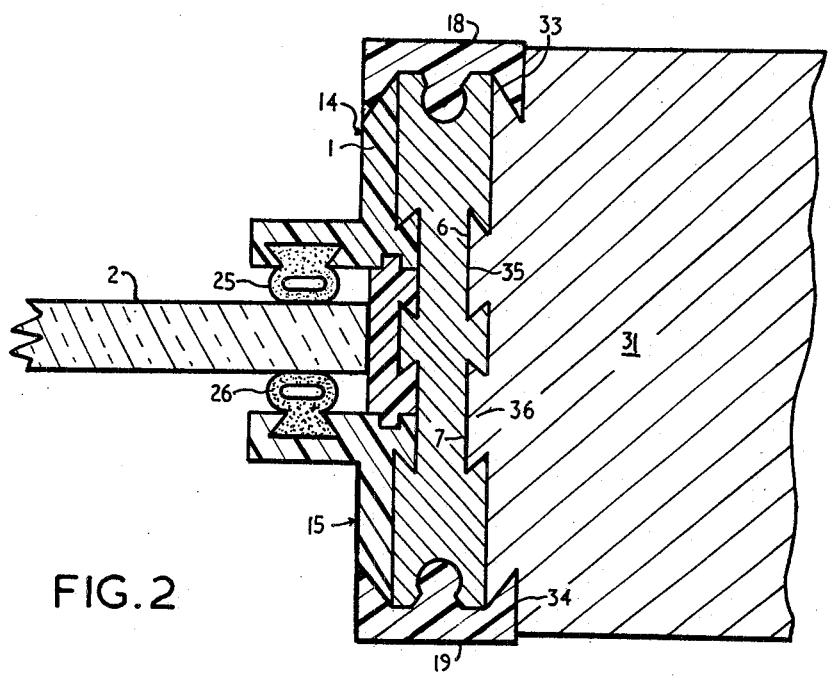

Reference will now be made to the accompanying drawings of which:

FIGURE 1 is a cross-sectional plan view of a vertical window mullion incorporating the invention, and, FIGURE 2 is a cross-sectional plan view of the invention applied to the side frame members of a window.

In accordance with the embodiment of the invention shown in FIGURE 1, a mullion comprises an extruded aluminium core denoted generally 1 of substantially oblong cross-section, the longest dimension of which is intended to lie normal to the plane of window panes 2 and 3.

In the long sides of the oblong core 1 are formed parallel longitudinal recesses 4, 5, 6 and 7 which extend throughout the length of the extrusion and which are separated by longitudinal ribs 8 and 9 which extend outwards between the recesses so that their outer surfaces lie normal with the plane of the surface of the respective long side.

The longitudinal edges of each recess are undercut as at 10 and 11 on recess 4 so that each recess and the adjacent edge of the rib define, in cross-section, a dovetail like form.

The short sides of the core are each provided midway thereof, with cylindrical recesses 12 and 13 extending for the full length of the core and merging with the short side to form a "lead" slot into the cylindrical recess of lesser width than the diameter of the recess, thus defining a substantially "key-hole" recess extending the full length of the core 1 and open to its short side.

The elongated core of oblong cross-section 1 is symmetrical about both its long and short centre lines.

To form the plastics cladding for this core, six plastics extrusions are required, four for covering the long sides of the oblong core and two for covering the short sides thereof. The four extrusions for the long sides 14, 15, 16 and 17 are identical in cross-section and the two for the short sides 18 and 19 are identical with each other, but different from those for the long sides.

The cladding for the long sides of the core is such that it also provides the glazing channel, and thus the two extrusions for each long side are substantially L-shaped in cross-section with the base of the L in each case extending parallel to the adjacent short side of the oblong. The base of the L also extends inwardly of the adjacent edge of the adjacent longitudinal recess and has a longitudinal male recessed dove-tail projection, one side of which engages beneath the undercut portion of the recess.

Referring now particularly to cladding 14, male dove-tail projection 20 is shown on base 21. A flat locking strip 22 of non-metallic rigid material engages in the recess at the other side of the dove-tail and extends across the recesses and intervening ribs and has dove-tail projections engaging in the undercut portions of the central longitudinal rib. The locking strip may be continuous along the member, but is preferably a plurality of spaced apart short lengths of strip. From the base of the L, an upright leg 23 extends normally thereto for some distance vertical to the dove-tail on the base. On the outer side of the base of the L (relative to the shape of the letter L) it is provided with a dove-tail slot 24 which extends longitudinally throughout the length of the member. In this slot is engaged the base of a hollow omega-shaped (Ω) resilient seal 25 which extends throughout the length of the member and provides a glazing seal for pane 2 in association with an identical L-shaped member and a seal 26 located on the opposite side of the central rib.

Each L-shaped member and seal, four of which are required for each core, is identical in shape, and the two L-shaped members are applied on opposite sides of the central rib merely by reversing them end-for-end.

Referring again to cladding 14, edge 27 of the upright leg of the L-shaped member where it lies at the short edge of the oblong core is slightly stepped towards the core and the base of the step is slightly chamfered towards its free edge to be engaged by a cover member or capping, by which it is held firmly in sealed relation with the core.

One capping member (short side cladding member) is required for each short side of the oblong core and as these are identical, only one is described.

Capping member 18 is a substantially channel section extrusion having a substantially omega-section solid rib 28 formed longitudinally down the centre of the channel, midway between its side flanges and throughout the length of the member. This solid rib is of such dimensions that it may be slid along the cylindrical recess 12 formed in the short sides of the core. The side flanges of the channel 29 and 30 are chamfered outwardly so that they will engage with the adjacent stepped and chamfered edges of corresponding L-shaped members on opposite long sides of the core.

It will be obvious from the above that any desired colour combination of the L-shaped members and capping members can be used and that when applied they completely enclose the metallic core and thus prevent the appearance of the mullion from deteriorating due to oxidation or other causes.

Referring now to FIGURE 2, the invention is shown in its application to a window side frame member in a door or wall. Thus window pane 2 is shown mounted to solid member 31 which may be the wooden frame of a door where pane 2 constitutes a window pane in the door.

As in FIGURE 1, a solid core 1 is utilized and on the window pane side of this, the structure is similar to the structure shown in FIGURE 1. Accordingly in FIGURE 2 parts identical with and having the same configuration as, those in FIGURE 1, have been given the same reference numerals as those parts.

On the frame side of core 1, cladding members 16 and 17 are replaced by the equivalently shaped face of solid member 31. The adjacent chamfered side flanges of capping members 18 and 19 engage in recesses 33 and 34 formed in the lateral extremities of member 31, whilst the longitudinal recesses 6 and 7 dove-tail with appropriately shaped projections 35 and 36. This solid member 31 provides an upright support for core 1 by providing engagement with one entire long side of the core.

The shape of the core member and cladding elements is thus seen to be applicable to both the mullions and side frame members of windows.

As has previously been stated, the scope of the invention is not intended to be limited only to the described embodiments, as now that these have been described, further modifications to adopt the invention to other uses will be readily apparent to those skilled in the art.

What I claim is:
1. A frame assembly comprising an elongated metallic non-ferrous extruded core member having formed longitudinally therein a plurality of recesses, a plurality of elongated plastics members arranged adjacent one another, each having a first longitudinal portion engaging in at least one of said recesses and a second longitudinal portion engaging with an adjacent one of said elongated plastics members, means between at least one adjacent pair of said elongated plastics members for engaging a window pane or like planar member in sealing relationship, said extruded core member being substantially rectangular in cross-section said recesses including two parallel longitudinal dove-tail recesses formed along each of its major longitudinal surfaces, said one adjacent pair of elongated plastics members for engaging a window pane or like planar member, comprising two similar substantially L sectioned elongated plastics members engaged in one of said major longitudinal surfaces of said extruded core member, each of said L sectioned members having a first limb disposed substantially at right angles to said major surface with one extremity in dove-tail engagement with a portion of one of said longitudinal dove-tail recesses nearest the adjacent minor surface of said extruded core member and a second limb substantially at right angles to said first limb, disposed toward said minor surface and positioned against a longitudinal portion of said major surface, and centrally disposed locking means being inserted between said two elongated plastics members in dove-tail engagement with the portions of said dove-tail recesses remote from said minor surfaces.

2. A frame assembly according to claim 1 wherein the opposing faces of said first limb of said two L sectioned members are each provided with a longitudinal recess and said means comprising a longitudinal resilient seal disposed therein, and said window pane or like planar member is engageable between said seals of said adjacent L sectioned members.

3. A frame assembly according to claim 2, wherein the other major longitudinal surface of said extruded core member is likewise provided with two L section elongated plastics members for engagement with a window pane or like planar member.

4. A frame assembly according to claim 2 wherein the other major longitudinal surface of said extruded core member engages in dove-tail fashion with the appropriately shaped longitudinal face of a support member.

5. A frame assembly according to claim 1, said extruded core member being further provided in each of its minor longitudinal surfaces with a centrally disposed longitudinally extending key opening engaging with an equivalently shaped longitudinal projection on a substantially channel sectioned elongated plastics capping member, said capping member covering said minor surface and adjacent longitudinal portions of the adjacent major surfaces.

6. A frame assembly according to claim 5 wherein the longitudinal edges of each capping member are stepped outwardly from the core member and the longitudinal edges of the second limbs of the L sectioned members are stepped inwardly so that the capping members engage in sealing relationship with adjacent L sectioned members.

7. A frame assembly according to claim 1, said locking means comprising a plurality of short lengths of shaped strip spaced longitudinally along said extruded core member.

References Cited

UNITED STATES PATENTS

| | | | |
|---|---|---|---|
| 2,197,913 | 4/1940 | Axe | 52—399 |
| 3,012,642 | 12/1961 | Emmerich | 52—400 |
| 3,090,083 | 5/1963 | Emmerich | 52—400 |
| 3,217,454 | 11/1965 | Leisibach | 52—500 X |

JOHN E. MURTAGH, Primary Examiner

U.S. Cl. X.R.

52—309, 732